United States Patent
Williams et al.

(10) Patent No.: US 7,839,429 B2
(45) Date of Patent: Nov. 23, 2010

(54) IN-CAMERA PANORAMA STITCHING METHOD AND APPARATUS

(75) Inventors: Karen E Williams, Fort Collins, CO (US); Christopher E. Webb, Fort Collins, CO (US); Angelica A. Quintana, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 895 days.

(21) Appl. No.: 11/139,456

(22) Filed: May 26, 2005

(65) Prior Publication Data
US 2006/0268130 A1  Nov. 30, 2006

(51) Int. Cl.
*H04N 13/02* (2006.01)
*G06K 9/32* (2006.01)

(52) U.S. Cl. ........................ 348/50; 382/299
(58) Field of Classification Search ................ 348/239, 348/208.7, 231.99, 333, 36, 42, 207.99, 218.1, 348/333.01
See application file for complete search history.

(56) References Cited

U.S. PATENT DOCUMENTS

| | | | |
|---|---|---|---|
| 5,933,137 A | 8/1999 | Anderson | |
| 6,771,304 B1 * | 8/2004 | Mancuso et al. | 348/39 |
| 6,834,128 B1 | 12/2004 | Altunbasak et al. | |
| 7,136,096 B1 * | 11/2006 | Yamagishi et al. | 348/218.1 |
| 2002/0097327 A1 * | 7/2002 | Yamasaki | 348/239 |
| 2002/0186307 A1 * | 12/2002 | Anderson | 348/231.99 |
| 2004/0227825 A1 * | 11/2004 | Sakimura et al. | 348/239 |
| 2004/0257456 A1 | 12/2004 | Goris et al. | |
| 2005/0089244 A1 | 4/2005 | Jin et al. | |

FOREIGN PATENT DOCUMENTS

JP  10164563     *  6/1998
JP  10164563 A   *  6/1998

OTHER PUBLICATIONS

Karen E. Williams, et.al.,"Method and Apparatus for Previewing a Panoramic Image on a Digital Camera",HP pending appl. 200406502-1,U.S. Appl. No. 11/055,885, filed Feb. 11, 2005,19 pg.

* cited by examiner

*Primary Examiner*—Jason Chan
*Assistant Examiner*—Joel Fosselman

(57) ABSTRACT

A method and apparatus are disclosed for accomplishing in-camera stitching of a high-resolution panoramic photograph from a set of component photographs while providing a satisfactory user experience. A low-resolution panorama is stitched, and a user of the camera performs a review of the low-resolution panorama using a display comprised in the camera. During the review, a high-resolution panoramic photograph is stitched by the camera in a background process.

15 Claims, 4 Drawing Sheets

IN-CAMERA PANORAMA STITCHING METHOD AND APPARATUS

FIELD OF THE INVENTION

The present invention relates to panoramic photography, and more specifically to panoramic photography using a digital still camera.

BACKGROUND OF THE INVENTION

A panoramic photograph is a photograph with an unusually large field of view, an exaggerated aspect ratio, or both. For example, a horizontal panoramic photograph is much wider than its height, and has a horizontal angle of view that is large in relation to its vertical angle of view. A vertical panoramic photograph is much taller than its width, and has a vertical angle of view that is large in relation to its horizontal angle of view. A panoramic photograph, sometimes called simply a "panorama", can provide a unique and sometimes striking view of a scene.

Historically, panoramic photographs have been taken using specially-made cameras. One kind of panoramic camera uses a rotating lens and body to sweep across a large field of view while moving film past a narrow exposure slit behind the lens. This kind of rotating camera, sometimes called a "Cirkut-type" camera after an early commercial model, can take a photograph with a field of view of 360 degrees or more. A swing-lens camera operates on a similar principle, but rotates its lens and the exposure slit in relation to a stationary body and film. A swing-lens camera can take a photograph with a field of view somewhat less than 180 degrees.

Another method of making a panoramic photograph is to take several overlapping conventional photographs, each typically having an aspect ratio of about 3:2, and then join them together into a single larger photograph. The joining is typically done using a computer operating on digital representations of the component photographs, for example photographs taken with a digital camera. The process of combining digital images into a larger photograph is often called "stitching" or "mosaicing". In principle, any number of component images can be stitched, and the resulting panorama can cover a field of view of up to 360 degrees or more.

FIGS. 1A-1D illustrate the process of creating a panoramic photograph from component photographs. FIG. 1A shows a landscape scene 100 with a wide aspect ratio. FIG. 1B shows three overlapping component photographs 101, 102, 103 of a conventional aspect ratio, taken so that each portion of scene 100 that is to be included in the resulting panoramic photograph is represented in at least one of the component photographs 101-103. FIG. 1C shows component photographs 101-103 in isolation. Certain features such as tree 104 and fence corner 105 appear in more than one of the component photographs, and may be used by the stitching process to align component photographs 101-103 with each other. FIG. 1D shows a panoramic photograph 106 constructed by stitching component photographs 101-103 together.

Methods are known in the art for accomplishing the stitching, and are typically computationally-intensive. For example, software performing image stitching may correct distortions, such as lens distortion and perspective distortion, present in the component images before stitching them together. Additionally, finding the proper alignment between component images may involve multiple computations of correlation coefficients that reflect the "goodness" of the alignment between image segments. Variations in tone, caused by effects such as changes in viewing angle and lens vignetting, may be corrected or otherwise accommodated. The time required to perform the stitching increases dramatically with increased size or resolution of the component images.

Some modern digital cameras provide a mode that assists a user of the camera in taking a set of component photographs for later stitching into a panoramic photograph. For example, a panoramic mode may use a display screen on the camera to assist the user in framing each component photograph for proper overlap with a previous photograph in the set, and may ensure consistent exposure settings for all of the component photographs in a set.

At least one digital camera model can perform stitching on a set of low-resolution "screen nail" images so that the photographer can detect obvious problems such as insufficient overlap in the component images. (A "screen nail" is a small low-resolution copy of a digital image, analogous to a "thumbnail" image, and is sized to fit an on-camera display. A typical screen nail image may be, for example, approximately 320 by 240 pixels.) This capability is described in U.S. patent application Ser. No. 11/055,885, filed on Feb. 11, 2005 and having a common assignee with the present application. However, previous digital cameras have not performed the stitching of high- or full-resolution images because the relatively simple processors used in digital cameras could not perform the computationally-intensive stitching algorithms quickly enough to provide a satisfactory user experience. Previously, a camera user who wished to stitch high-resolution component images into a panorama had to upload the component images to a computer and use software executing on the computer to perform the stitching. This prior method required the use of a computer, possibly including installing additional software on the computer, and prevented the user from immediately printing or sharing the panorama.

DETAILED DESCRIPTION

Figure 1A:
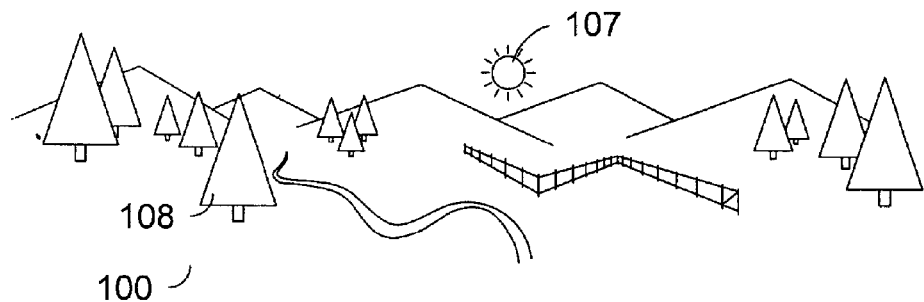
FIG. 1A shows a landscape scene with a wide aspect ratio.
Figure 1B:
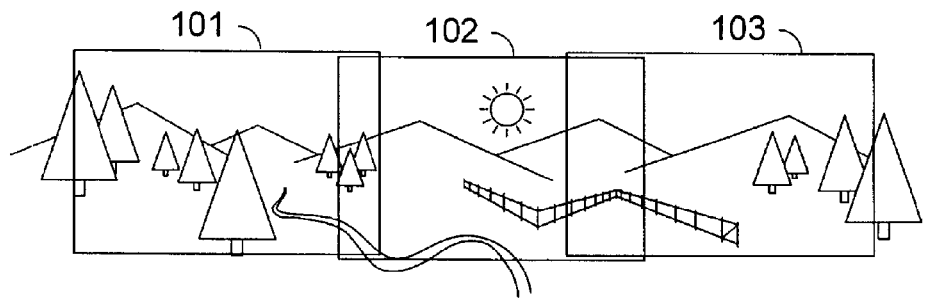
FIG. 1B shows three overlapping component photographs of a conventional aspect ratio, taken of the scene of FIG. 1A.
Figure 1C:
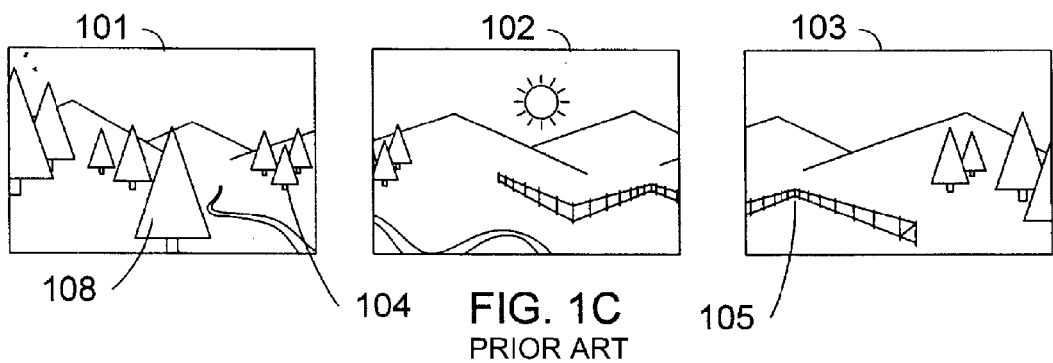
FIG. 1C shows the component photographs of FIG. 1B in isolation.
Figure 1D:
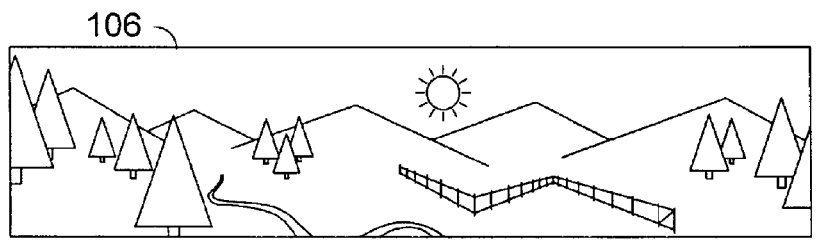
FIG. 1D shows a panoramic photograph constructed by stitching together the component photographs of FIG. 1B.
Figure 2:
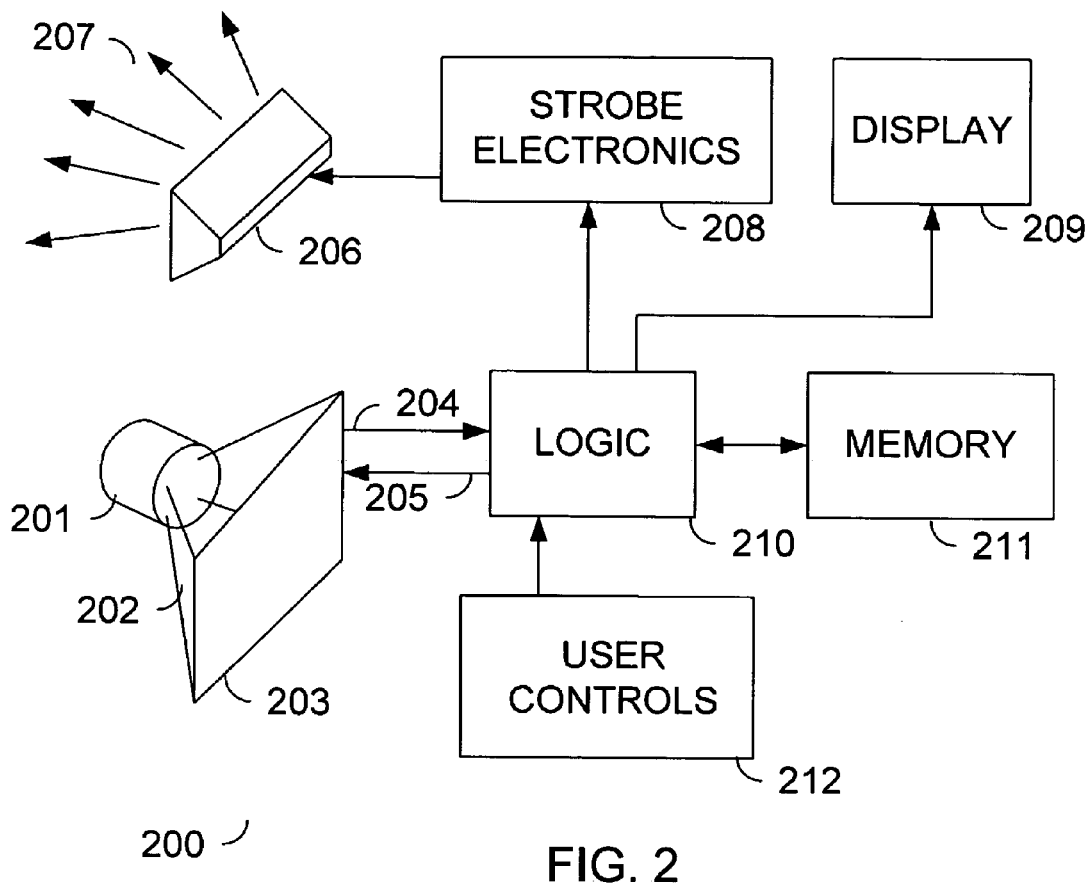
FIG. 2 shows a simplified block diagram of a digital camera.

FIG. 2 shows a simplified block diagram of a digital camera 200. Lens 201 gathers light emanating from a scene, and redirects the light 202 to an electronic array light sensor 203. Sensor 203 comprises an array of light-sensitive elements, often called pixels. Each pixel on array 203 corresponds to a particular scene location by virtue of the operation of lens 201. A common type of electronic array light sensor generates, at each pixel, electric charge at a rate proportional to the intensity of light falling on the pixel, and stores these charges in charge coupled devices (CCDs). Such a sensor is often called a "CCD sensor", or simply a "CCD". Other kinds of sensors may be used as well, for example, an active pixel complementary metal oxide semiconductor (CMOS) sensor. In many cameras, each sensor pixel also comprises a color filter so that color information about the scene is obtained. One of skill in the art will recognize that the invention may be embodied in a camera with color capability or one without. Sensor 203 communicates image data signals 204 to logic 210. Logic 210 may comprise an analog to digital converter, a microprocessor, a digital signal processor, or other kinds of circuitry, or any of these in combination. In one preferred embodiment, logic 210 comprises an integrated digital camera control circuit such as the TMS320DM320 processor for digital still cameras, available from Texas Instruments Incorporated of Dallas, Tex., USA.

Logic 210 converts image data signals 204 to digital values representing the light intensities measured at the sensor pixel sites. An ordered array of these digital values, each representing the brightness, color, or both of a particular scene location, may be called a digital image or a digital photograph. These digital values may also be called "pixels" or "pixel values". When a digital image is properly interpreted and displayed, a representation of the original scene can be reproduced from the digital image. For the purposes of this disclosure, the term "photograph" means any recorded representation of a scene, and encompasses images recorded on photographic film, images printed on paper or other stock, and digital scene representations.

Logic 210 may also perform other functions, such as generally controlling the operation of camera 200, controlling sensor 203 through control signals 205, interacting with a user of the camera through display 209 and user controls 212, processing digital images, and transmitting digital images to other equipment for processing, display, or printing. User controls 212 may comprise, for example, one or more buttons, dials, switches, or other controls, or any of these in combination. It is desirable that camera 200 respond quickly to accomplish the tasks requested by the user, both to avoid user frustration, and so that camera 200 is available to take advantage of fleeting photographic opportunities.

A flash or strobe unit 206 may provide supplemental light 207 to the scene under the control of strobe electronics 208, which are in turn controlled by logic 210. Memory 211 provides storage for digital images captured by the camera, as well as for camera configuration information, for program instructions for logic 210, and for other items.

Figure 3:
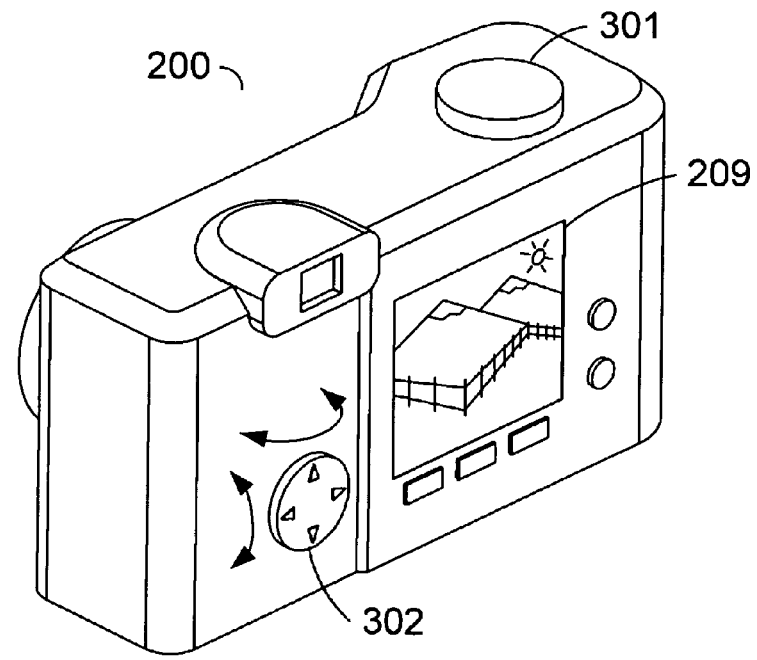
FIG. 3 shows the camera of FIG. 2 in a perspective view.

In a preferred embodiment, a processor comprised in logic 210 runs a real-time, multi-tasking operating system, enabling camera 200 to prioritize tasks into "foreground" and "background" operations. An example of a real-time multi-tasking operating system compatible with many microprocessors is the ThreadX operating system available from Green Hills Software, Inc., of Santa Barbara, Calif., USA. Foreground operations are those that are performed substantially immediately upon receipt of a user's instruction. For example, an important user control comprised in controls 212 is a shutter release button 301, shown in FIG. 3. A shutter release is the control that a photographer presses to instigate the taking of a photograph. When camera 200 is in a mode that enables the taking of photographs, responding to the shutter release by quickly starting the picture taking sequence is a high-priority foreground task.

Similarly, when camera 200 is in a mode for viewing previously-taken photographs on display 209, a control such as four-way rocker switch 302 may enable the user to sequentially review photographs stored in memory 211. Responding to switch 302 is a high-priority foreground task, so that the user can accomplish the review quickly, and camera 200 responds to the user's inputs crisply.

Background tasks may be performed without significant interaction with the user, and may use the processor during times between foreground tasks, when the processor would otherwise be waiting for user instructions. Camera 200, in accordance with an example embodiment of the invention, uses a combination of foreground and background processing to enable panoramic image stitching in-camera while still providing a satisfactory user experience.

Figure 4:
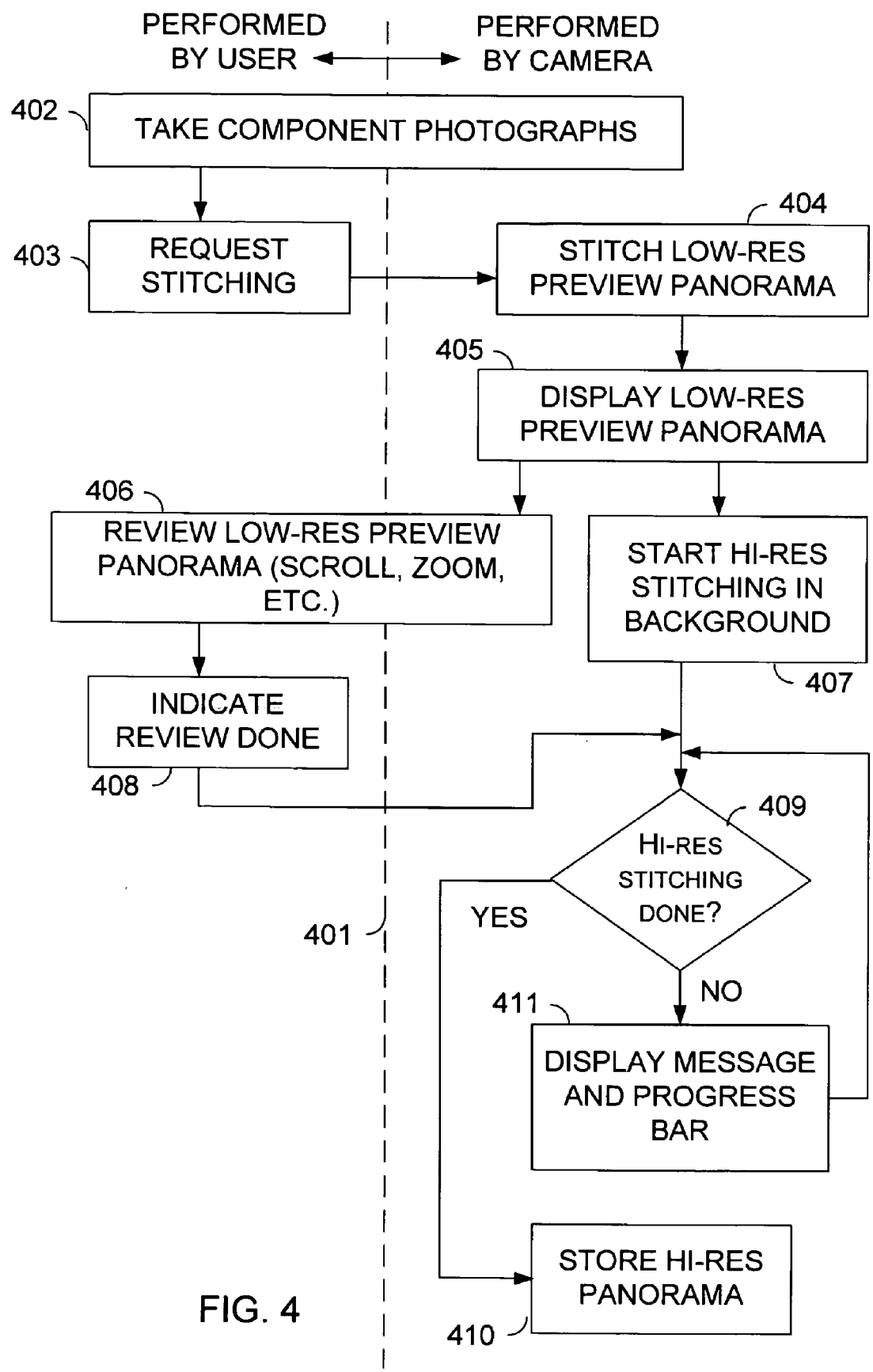
FIG. 4 shows a flowchart of an interaction, in accordance with an example embodiment of the invention, between a camera and a user of the camera.

FIG. 4 shows a flowchart of an interaction in accordance with an example embodiment of the invention between a camera and a user of the camera. Process blocks entirely to the left of dividing line 401 are performed by the camera user, and process blocks entirely to the right of dividing line 401 are performed by the camera. Process blocks extending across dividing line 401 involve cooperative interaction between the camera and the user, the details of which are incidental to understanding the invention.

In step 402, at least two component photographs are taken. At step 403, the user of the camera indicates, for example using one of user controls 212, that the component photographs are to be stitched into a panoramic photograph. In step 404, the camera stitches together a low-resolution "preview" panorama, for example from screen nail-sized copies of the component photographs. Because the low-resolution copies are small, the stitching of the preview panorama occurs very quickly, for example in a second or two.

In step 405, the camera displays at least a portion of the preview panorama on the camera display 209. In step 406, the preview panorama is reviewed by the user. During the review, the user may, for example, use a control such as rocker switch 302 to "pan" the preview image back and forth in display 209, or to enlarge ("zoom") portions of the image so as to expose any obvious problems that could be corrected by re-taking the component photographs. In parallel with the review, the camera begins stitching of a higher-resolution panorama from the component photographs in a background process step 407. In this context, "high-resolution" means significantly higher resolution than a screen nail resolution, but need not mean the full native resolution of the camera. For example, a digital camera may comprise a 5-megapixel sensor and be capable of producing full native resolution photographs having five megapixels per color plane, but use a screen nail image size of 320×240 pixels, or about 0.08 megapixels per image color plane. High-resolution stitching may be performed on scaled versions of the component images that are, for example, 1200×800 pixels each (about 1 megapixel per color plane), 1200×1800 pixels each (about 2.2 megapixels per color plane), or another size significantly larger than the screen nail size, including the full native resolution of the camera (5 megapixels per color plane in this example).

This background process 407 is invisible to the camera user for as long as review 406 proceeds, and uses processor time that is available during review 406. For example, during review 406 the user may press a user control 212 to cause the preview panorama to pan in display 209. The camera does the panning immediately in the foreground, which may take, for example a few milliseconds. The user may then spend several seconds studying the result before requesting another foreground task such as panning to a different location in the preview panorama. During those several seconds, the camera can make substantial progress on background high-resolution stitching step 407, using processor time that would otherwise have been spent simply waiting for the next user input.

At step 408, the user indicates, for example using one of user controls 212, that review step 406 is finished. If high-resolution stitching step 407 is finished, as determined at decision step 409, the camera simply stores the resulting high-resolution panorama at step 410, for example in nonvolatile flash memory comprised in memory 211. Otherwise, the camera displays a message at step 411 to indicate that work is in process on the high-resolution panorama and continues processing. The message may include a progress graph, and may include text, for example "Saving Panorama".

Figure 5:
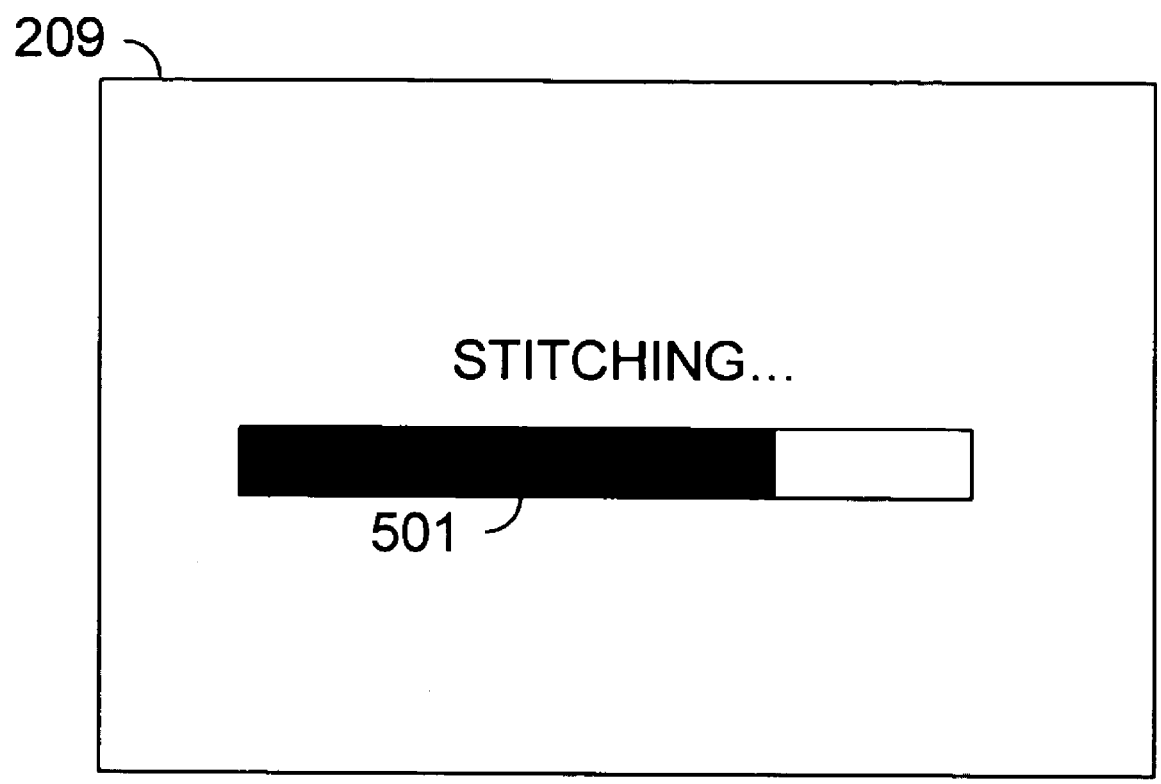
FIG. 5 shows an example message that may be shown on a camera display while stitching is completed.

FIG. 5 shows an example message that may be shown on display 209 while stitching is completed. Progress graph 501 indicates the progress of the stitching process. Progress graph 501 is a common "thermometer" box, wherein the rectangle is filled in proportion to the fraction of the monitored process that is completed.

High-resolution stitching step 407 may require, for example, a minute or more of processor time. If the user spends as long examining the preview panorama as is required to complete high-resolution stitching step 407, then the high-resolution stitching adds no apparent time to the process of creating a panorama. Even if the user spends less time examining the panorama than is required to complete high-resolution stitching step 407, much of the stitching may be completed before the user is finished with the review, so that the remaining time the user must wait for stitching step 407 to complete is reduced. Using background processing thus enables in-camera stitching of a high-resolution panorama with much or all of the processing time hidden in the review step 406. The perceived stitching performance is improved, as compared with performing the high-resolution stitching as a foreground process, and user frustration may be avoided.

The invention claimed is:

1. A method, comprising:
   a camera capturing a set of component photographs;
   the camera stitching low-resolution versions of the component photographs into a low-resolution panorama;
   the camera displaying the low-resolution panorama on a display of the camera, wherein the displaying is controlled by a foreground process responsive to activation of a control of the camera; and
   the camera creating from the set of component photographs a high-resolution panorama that is higher in resolution than the low-resolution panorama, wherein the creating comprises stitching together images different from the low-resolution versions of the component photographs in a background process that is performed by the camera with a lower priority than the foreground process.

2. The method of claim 1, further comprising storing the high-resolution panorama.

3. The method of claim wherein the component photographs are of the full native resolution of the camera.

4. The method of claim further comprising presenting the low-resolution panorama on the display responsive to a activation of a second control of the camera.

5. The method of claim 4, further comprising, when the creating of the high-resolution panorama is incomplete at the time of the second control of the camera is activated, displaying a message on the display.

6. The method of claim 5, wherein the message comprises a graphic indication showing progress of the creating of the high-resolution panorama.

7. The method of claim 1, wherein each low-resolution component image version is at least 320 by 240 pixels in size.

8. A camera, comprising a display and logic unit, the logic unit configured to enable the camera to perform a method comprising:
   capturing a set of component photographs;
   stitching low-resolution versions of the component photographs into a low-resolution panorama;
   displaying the low-resolution panorama on a display of the camera, wherein the displaying is controlled by a foreground process responsive to activation of a control of the camera;
   and
   creating from the component photographs a high-resolution panorama that is higher in resolution than the low-resolution panorama, wherein the creating comprises stitching together images different from the low-resolution versions of the component photographs in a background process that is performed by the camera with a lower priority than the foreground process.

9. The camera of claim 8, wherein the logic unit comprises a microprocessor running a real-time multi-tasking operating system.

10. The camera of claim 8, further comprising nonvolatile storage, and wherein the method further comprises storing the high-resolution panorama in the nonvolatile storage.

11. The camera of claim 8, further comprising a second control controlling presentation of the low-resolution panorama on the display.

12. The camera of claim 11, wherein
   when the second control is activated before the stitching of the high-resolution panorama is complete, the method comprises displaying on the display a message indicating that the creating of the high-resolution panorama is in process.

13. The camera of claim 12, wherein the message comprises a graphical indication showing progress of the creating of the high-resolution panorama.

14. The camera of claim 8, comprising:
   an image sensor; and
   a memory.

15. A camera, comprising:
   means for capturing a set of component photographs;
   means for stitching low-resolution versions of the component photographs into a low-resolution panorama;
   means for displaying the low-resolution panorama on a display of the camera, wherein the displaying is controlled by a foreground process responsive to activation of a control of the camera; and
   means for creating from the set of component photographs a high-resolution panorama that is higher in resolution than the low-resolution panorama, wherein the creating comprises stitching together images different from the low-resolution versions of the component photographs in a background process that is performed by the camera with a lower priority than the foreground process.

* * * * *

UNITED STATES PATENT AND TRADEMARK OFFICE
CERTIFICATE OF CORRECTION

PATENT NO.          : 7,839,429 B2                       Page 1 of 1
APPLICATION NO.     : 11/139456
DATED               : November 23, 2010
INVENTOR(S)         : Karen E Williams et al.

It is certified that error appears in the above-identified patent and that said Letters Patent is hereby corrected as shown below:

In column 5, line 49, in Claim 3, delete "claim" and insert -- claim 1, --, therefor.

In column 5, line 51, in Claim 4, delete "claim" and insert -- claim 1, --, therefor.

Signed and Sealed this

Twenty-second Day of March, 2011

David J. Kappos
*Director of the United States Patent and Trademark Office*